United States Patent
Watanabe et al.

(10) Patent No.: US 7,021,618 B2
(45) Date of Patent: Apr. 4, 2006

(54) AUTOMATIC DOCUMENT FEEDING APPARATUS AND DOCUMENT READING APPARATUS

(75) Inventors: Yasuhito Watanabe, Yamanashi-ken (JP); Tatsuzo Aoyagi, Minami-alps (JP); Fumihito Endo, Yamanashi-ken (JP)

(73) Assignee: Nisca Corporation, Yamanashi-Ken (JP)

( * ) Notice: Subject to any disclaimer, the term of this patent is extended or adjusted under 35 U.S.C. 154(b) by 77 days.

(21) Appl. No.: 10/600,509

(22) Filed: Jun. 23, 2003

(65) Prior Publication Data

US 2004/0004320 A1   Jan. 8, 2004

(30) Foreign Application Priority Data

Jun. 24, 2002 (JP) .............................. 2002-182659
Jul. 30, 2002 (JP) .............................. 2002-222040

(51) Int. Cl.
*B65H 83/00* (2006.01)
(52) U.S. Cl. .................... 271/3.14; 271/4.07; 271/264; 271/10.11; 271/4.1; 399/367; 358/1.12
(58) Field of Classification Search ............... 271/3.14, 271/3.18, 4.01, 4.05, 4.07, 4.08, 4.1, 10.01, 271/10.06, 10.08, 10.09, 10.11, 264; 399/367; 358/1.12
See application file for complete search history.

(56) References Cited

U.S. PATENT DOCUMENTS

| | | | | |
|---|---|---|---|---|
| 3,762,813 A | * | 10/1973 | Fowlie et al. | 399/364 |
| 5,816,569 A | * | 10/1998 | Hoshi et al. | 271/117 |
| 5,881,350 A | * | 3/1999 | Wada et al. | 399/367 |
| 5,887,866 A | * | 3/1999 | Yamauchi et al. | 271/116 |
| 6,128,455 A | * | 10/2000 | Horiguchi et al. | 399/124 |
| 6,219,511 B1 | * | 4/2001 | Okada | 399/203 |
| 6,512,602 B1 | * | 1/2003 | Sheng et al. | 358/498 |
| 6,618,575 B1 | * | 9/2003 | Takida et al. | 399/367 |
| 6,644,658 B1 | * | 11/2003 | Sheng et al. | 271/264 |
| 6,747,763 B1 | * | 6/2004 | Lin | 358/474 |

FOREIGN PATENT DOCUMENTS

| | | |
|---|---|---|
| JP | 59-61662 | 4/1984 |
| JP | 10-236690 | * 9/1998 |
| JP | 2000-327168 | * 11/2000 |

OTHER PUBLICATIONS

Patent Abstract of Japan, No. 63-180650, publication date Jul. 25, 1988, Applicant Canon Inc.
Patent Abstract of Japan, No. 10-055079, publication date Feb. 24, 1998, Applicant Canon Inc.

* cited by examiner

*Primary Examiner*—Donald P. Walsh
*Assistant Examiner*—Thomas Morrison
(74) *Attorney, Agent, or Firm*—Manabu Kanesaka

(57) ABSTRACT

An automatic document feeder is provided with the first transport device and the second transport device for feeding an original at a reading position to read the original, and a curved reading path disposed between the first transport device and second transport device. The automatic document feeder is also provided with a reading guide unit including the first guide member disposed at an upstream side of the reading position in an original feeding direction for guiding the original to the reading position, the second guide member disposed at a downstream side of the reading position in the original feeding direction for guiding the original from the reading position, a flexible transparent film member extending between the first guide member and the second guide member for forming the reading path. The reading guide unit is detachably and rotatably supported on an apparatus frame of the automatic document feeder.

11 Claims, 11 Drawing Sheets

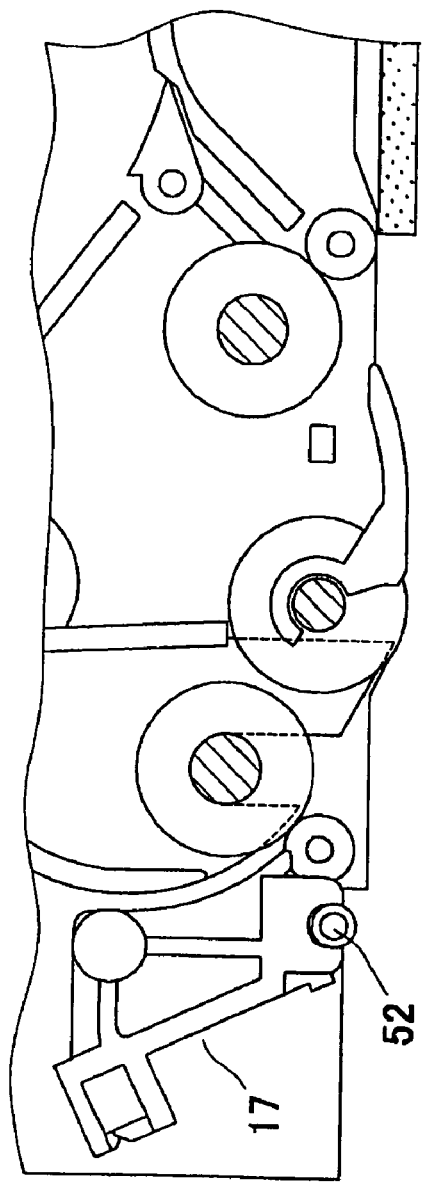
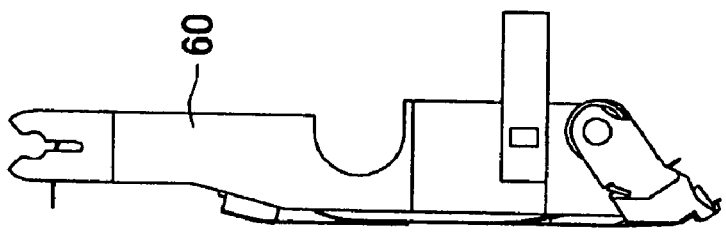
Fig. 8

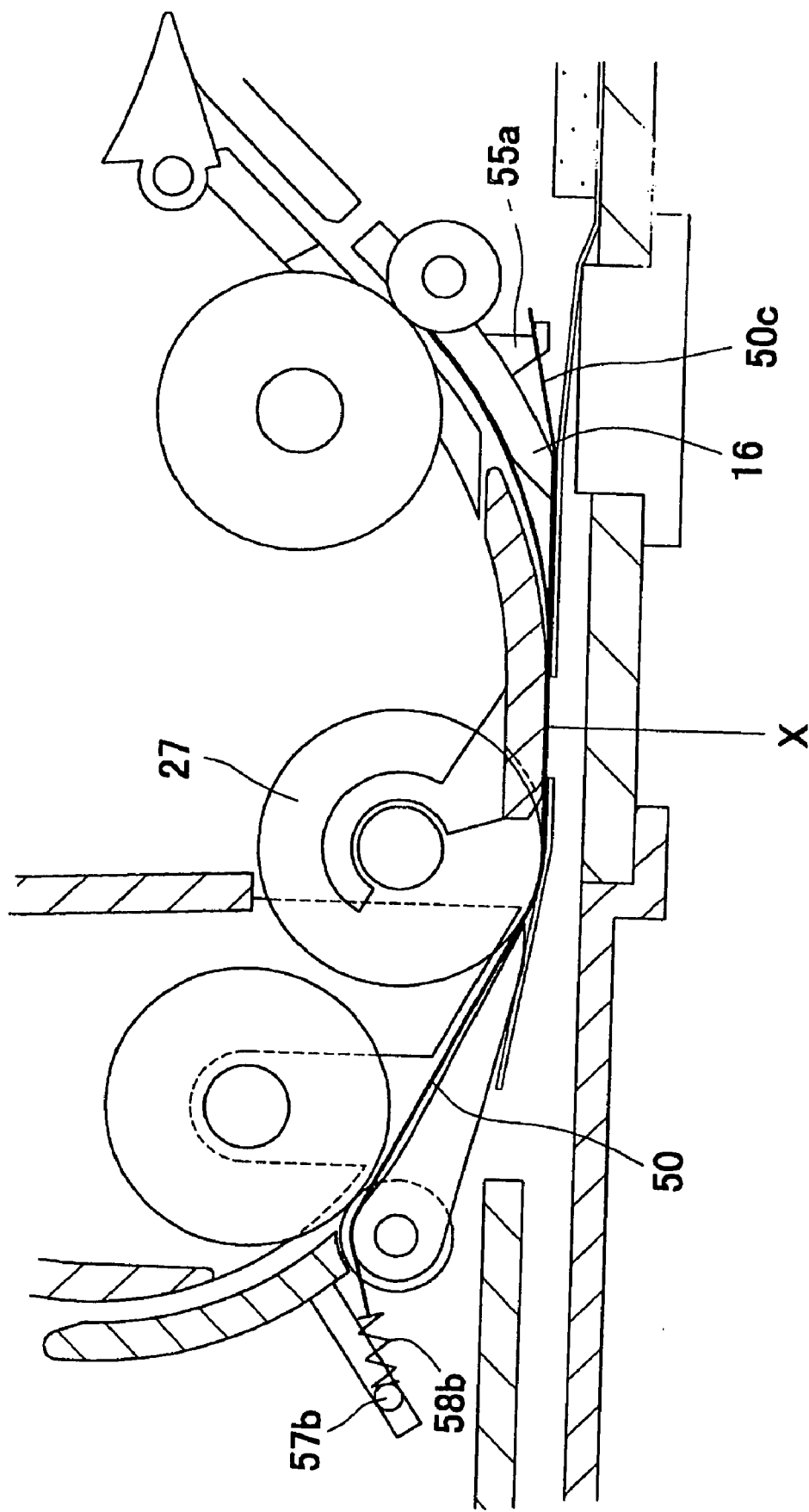

US 7,021,618 B2

AUTOMATIC DOCUMENT FEEDING APPARATUS AND DOCUMENT READING APPARATUS

BACKGROUND OF THE INVENTION AND RELATED ART STATEMENT

The present invention relates to a document or original reading apparatus provided in an image forming apparatus such as a copier or facsimile, and particularly to an automatic document feeding apparatus or feeder in an original reading apparatus.

In an optical reading apparatus provided in an image forming apparatus, methods of reading an original include a stationary original reading method in which transport means such as a belt or roller feeds an original on a platen, and an optical reading system scans the original placed stationary on the platen to read an image on the original, and a sheet through reading method in which an optical reading system situated at a fixed reading position reads an original while a feeding apparatus is transporting the original.

In the sheet through reading method, a conventional original reading apparatus includes the first platen for placing the original and the second platen arranged adjacent to the first platen. In the original reading apparatus, reading means moves in a sub-scanning direction (original feeding direction) to read the original such as a book placed stationary on the first platen. Also, the original supplied from a sheet supply tray in an original feeding apparatus passes over the second platen, and the stationary reading means disposed below the second platen reads an image on the original.

In the conventional original reading apparatus with a configuration described above, as shown in FIG. 11(a), a reading unit is provided with a pair of feed rollers 102 arranged at an upstream side of the second platen 101, a pair of discharge rollers 103 arranged at a downstream side of the second platen 101, and a curved reading path 106 including a guide 104 facing an upper surface of the second platen 101. After the feed rollers 102 feed the original from a sheet supply tray (not shown) disposed at an upstream side of the feed rollers 102 to the second platen 101, a lifting member 105 disposed between the first platen 100 and the second platen 101 lifts and guides the original from the upper surface of the second platen 101 to the discharge rollers 103.

However, in the reading unit of such an original reading apparatus, when the lifting member 105 lifts a leading edge of the original from the second platen 101, the leading edge of the original strikes an oblique surface of the lifting member 105 to create a shock. As a result, the original tends to vibrate or is transported at various speeds at the reading position, thereby causing distortion of the read image. Further, when a trailing edge of the original passes through and exits a nipping point of the feed rollers 102, the trailing edge of the original drops downward to cause an unsteady transport of the original and a variation in the speed of the original, thereby causing distortion of the read image.

To solve these problems, another conventional apparatus is provided with a transparent film member 207 on the second platen 201, as shown in FIG. 11(b), so that the original is transported along the transparent film member 207.

The transparent film member 207 is arranged between a guide 204 and the second platen 201, and forms a curved reading path between the guide 204 and the film member 207. An end 207a of the transparent film member 207 is fastened to a backside of the guide 208 at an upstream side of the reading path 206, and the other end 207b is free and inserted into an inside of a downstream guide 209 of the reading path 206.

The transparent film member is made of a flexible material such as polyethylene terephthalate (Mylar), and is positioned to face substantially the entire length of the second platen 201 and touch the upper surface of the second platen 201. With this configuration, the feed rollers 202 feed the original supplied to the reading unit between the transparent film member 207 and the guide 204 to pass above the second platen 201. The reading means located stationary below the second platen 201 at the reading position reads the image on the original through the second platen 201 and the transparent film member 207. After reading the image, the original is guided to the discharge rollers 203 along the transparent film member 207 to discharge.

The transparent film member 207 tends to be scratched or become dirty through friction with the original transported, thereby affecting the image on the original. Therefore, it is necessary to clean an original guide surface or replace the transparent film member 207 periodically. When the transparent film member is replaced, it is necessary to open the automatic document feeder relative to the image reading apparatus. Accordingly, the replacement work is confined to a limited space. As a result, depending on a way of handling, it is possible to scratch or bend the transparent film member, thereby making the replacement work troublesome. Also, when the transparent film member is inserted into the discharge path from a downstream edge thereof in the original feeding direction, it is difficult to insert the edge completely, thereby causing the original to be jammed.

In view of the problems described above, an object of the present invention is to provide an automatic document feeder in which it is easy to perform maintenance on a transparent film member disposed at a reading position for transporting the original stably without damaging the transparent film member.

Further objects and advantages of the invention will be apparent from the following description of the invention.

SUMMARY OF THE INVENTION

In order to attain the objects described above, according to the present invention, an automatic document feeder is provided with first transport means and second transport means for feeding an original at a reading position to read the original, and a curved reading path disposed between the first transport means and second transport means. The automatic document feeder is also provided with a reading guide unit including a first guide member disposed at an upstream side of the reading position in an original feeding direction for guiding the original to the reading position, a second guide member disposed at a downstream side of the reading position in the original feeding direction for guiding the original from the reading position, a flexible transparent film member extending between the first guide member and the second guide member for forming the reading path. The reading guide unit is detachably or rotatably supported on an apparatus frame of the automatic document feeder.

With this configuration, it is possible to easily perform maintenance work such as replacement or cleaning of the film member in a short period of time without damaging the film member.

BRIEF DESCRIPTION OF THE DRAWINGS

FIG. 8 is a sectional view showing the reading guide unit removed from the apparatus frame;

FIG. 10 is a view showing an essential portion of another tension application means.

DETAILED DESCRIPTION OF PREFERRED EMBODIMENTS

Figure 1:
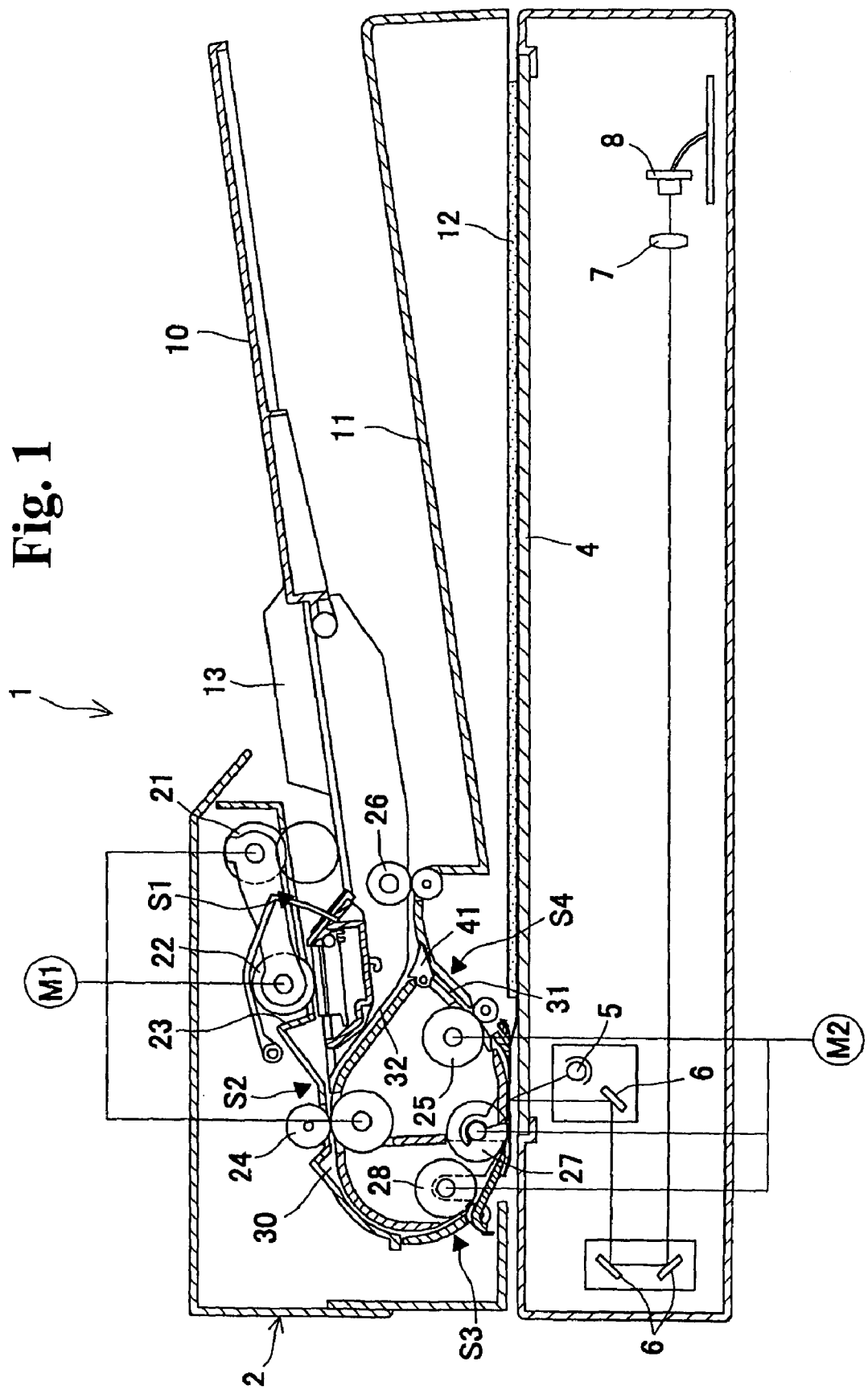
FIG. 1 is a view showing an overall structure of an automatic document feeder according to the present invention.

Hereunder, embodiments of the present invention will be described with references to the accompanying drawings. FIG. 1 is a sectional view showing an automatic document feeder 2 mounted onto an image reading apparatus 1 according to the present invention.

In a main unit of the original reading apparatus 1, a light source 5 such as a lamp radiates light onto a transported original through a platen 4. A plurality of mirrors 6 reflects the light from the original into a reading element 8 such as a CCD via a lens 7 to read an image on the original and convert photo-electrically.

The original reading apparatus 1 has a mode in which an optical unit having the light source 5 and mirrors 6 moves in a sub-scanning direction to read an image on a thick original placed on the platen 4 through the platen 4, and a mode in which a stationary optical unit reads an original transported over the platen 4 by the automatic document feeder at a predetermined reading position.

In an embodiment of the apparatus shown in FIG. 1, the image reading apparatus is configured to have a two-carriage system. The present invention is also applicable to an image reading apparatus of one-carriage system in which an optical reading device with one carriage, which has the light source 5, the mirrors 6, the lens 7 and the reading elements 8, moves below the platen 4 from the right side to the left side in the drawing to read an image on an original.

The automatic document feeder is provided with a sheet supply tray 10 for placing a plurality of the originals; a discharge tray 11 for storing the originals after reading, and a pressing cover 12 formed of a porous member such as a sponge and a film member such as a white Mylar film for pressing the platen 4.

A sheet supply portion is formed of a feed roller 21 movable vertically for touching and feeding the uppermost original stacked on the sheet supply tray 10; separating means having a sheet supply roller 22 for feeding the original fed by the feed roller 21 and a separating member 23 for allowing only the uppermost original to pass and blocking the subsequent sheets from being fed; and a pair of register rollers 24 for touching a leading edge of the original separated by the separation means to feed the original downstream.

The feed roller 21, the sheet supply roller 22 and the pair of the register rollers 24 guide the original on the sheet supply tray 10 along a sheet supply path 30. A sheet supply motor M1 is connected to drive the feed roller 21 and sheet supply roller 22 via a one-way clutch OW1 (not shown). The sheet supply motor M1 is also connected to drive the pair of the register rollers 24 via a one-way clutch OW2 (not shown). The sheet supply motor M1 rotates forward to drive the feed roller 21 and sheet supply roller 22, and rotates in reverse to drive the pair of the register rollers 24.

A pair of discharge rollers 26 is arranged in a discharge portion for discharging the original from a pair of discharge rollers 25 to the discharge tray 11 along the discharge path 31. A transport/discharge motor M2 capable of both forward and reverse rotations is connected to the pair of the discharge rollers 26. In a duplex mode, it is controlled to rotate the discharge rollers 26 in reverse while nipping the trailing edge of the original to return the original to the sheet transfer path 35 via a circulation path 32 to switchback the original.

A free-falling flapper 41 is disposed in the discharge path 31. When the leading edge of the original passes through, the flapper raises to pass the original, and after the trailing edge of the original passes through, the flapper falls downward. The free-falling flapper 41 guides the original into the circulation path 32 without any hindrance when the discharge rollers 26 rotate in reverse to switch back the original. The flapper 41 is constantly urged downward by an urging spring.

When the original is fed to the pair of the discharge rollers 26 along the discharge path 31, the leading edge of the original raises the flapper 41 upward to allow the original to pass. When the pair of the discharge rollers 26 switchbacks the original, the flapper falls downward and covers the discharge path 31 to guide the original into the circulation path 32.

An empty sensor S1 is disposed at a downstream side of the sheet supply tray 10 in the original feeding direction for detecting the original stacked on the sheet supply tray 10. A register sensor S2 is disposed in the sheet supply path 30 for detecting the trailing edge of the original. A read sensor S3 is disposed in front of the reading portion and a discharge sensor S4 is disposed in front of the pair of the discharge rollers 26 for detecting the trailing edge of the original.

The sensors S1 to S4 are connected to control means having a CPU for controlling the transport of the original. Based on the detection signals from each of the sensors, the motors M1 and M2, mentioned above, and each solenoid SOL1 (not shown) are controlled to transport the original.

A plurality of sensors is disposed on the sheet supply tray 10 in the original feeding direction for detecting a length of the original placed on the sheet supply tray 10 using signals output from the sensors. A side guide 13 is disposed on the sheet supply tray 10 for regulating the original in the width direction. A width of the original is determined by a volume (not shown) variably output according to an amount of movement of the side guide 13. Accordingly, it is possible to determine a size of the original based on the detection of the length and width of the original.

Figure 2:
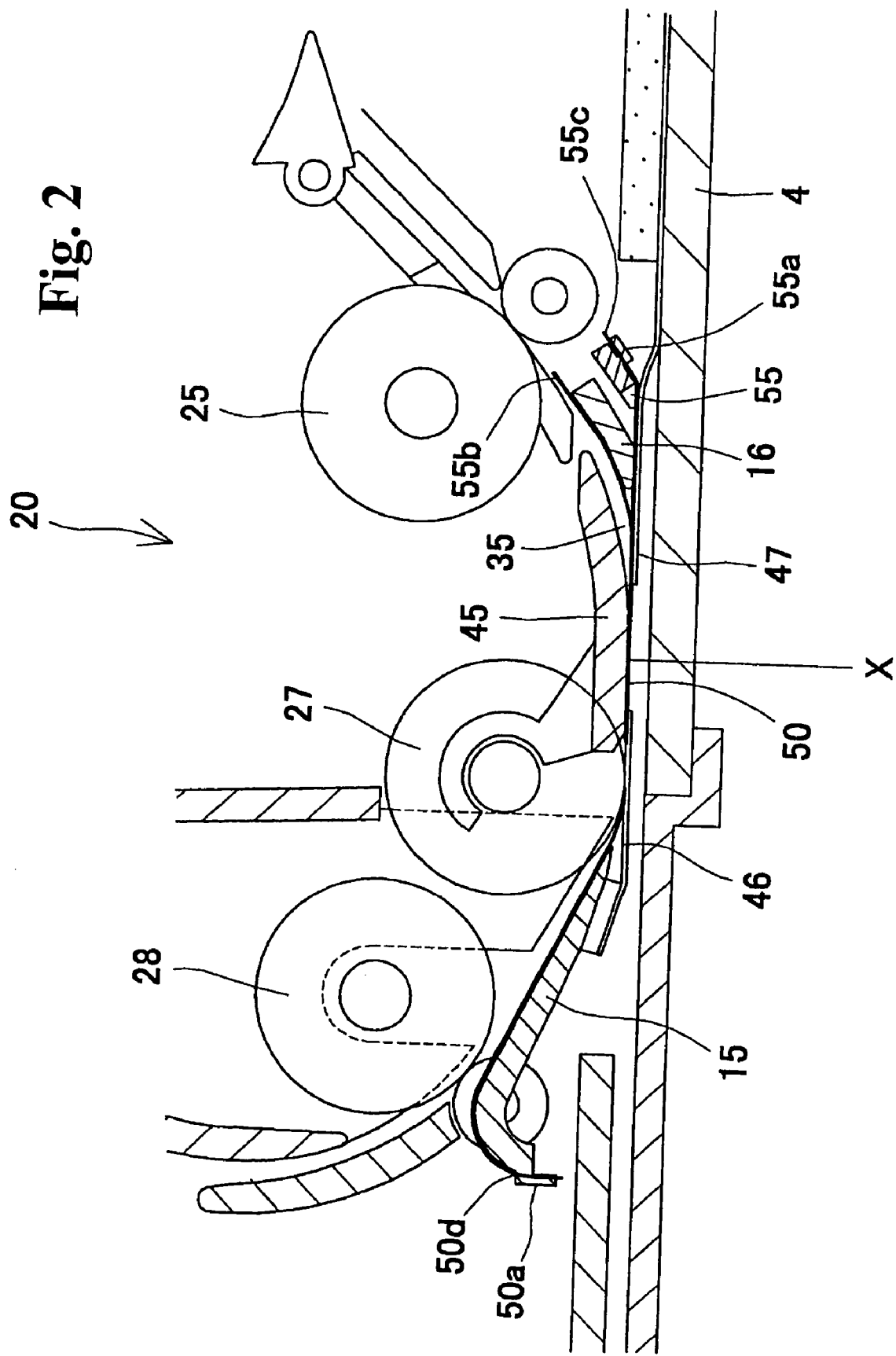
FIG. 2 is a view showing an essential portion of the automatic document feeder.

As shown in FIG. 2, a reading portion 20 of the apparatus is composed of a pair of transfer rollers 28 for feeding the original to a reading position X; a transfer guide 15 for guiding the original from the transfer rollers 28 toward the reading position X; a discharge roller 25 for discharging the original read at the reading position X; a discharge guide 16 for guiding the original from the reading position X to the discharge roller 25; a transparent film member 50 formed of a flexible material for forming a curved original reading path at the platen side extending between the transfer guide 15 and the discharge guide 16; a platen roller 27 disposed between the reading position X and the pair of the transfer rollers 28 for contacting the transparent film member 50; and a white back-up guide 45 disposed at a downstream side of the platen roller 27 for contacting the transparent film member 50.

White film members 46 and 47 are disposed between the transparent film member 50 and the platen 4. The white film members 46 and 47 are disposed in front of and behind the reading position X in the original feeding direction. The white film members 46 and 47 are provided for attaining a good quality image even when a thin original manually placed on the platen 4 passes through the light from the light source 5.

Figure 3:
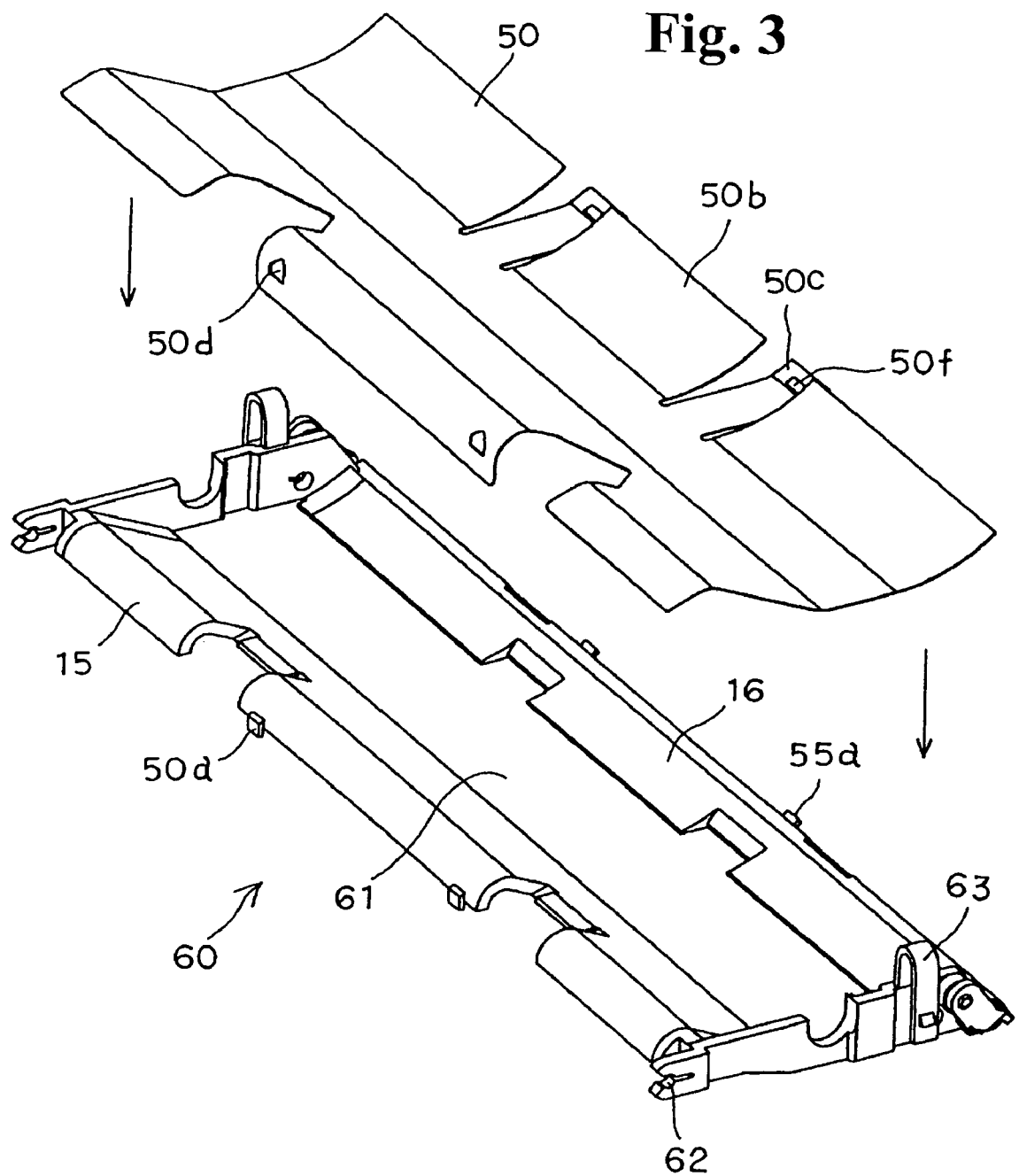
FIG. 3 is a perspective view of a configuration of a reading guide unit.

FIG. 3 is a perspective view showing a configuration of the transparent film member 50, the transfer guide 15 and the discharge guide 16.

A plurality of mounting holes 50d is formed at an edge of the transparent film member 50 at an upstream side in the original feeding direction. Protrusions 50a are formed on the transfer guide 15 as fasteners for engaging the mounting holes 50d so that the transparent film member 50 is supportably mounted. Tongue portions 50b and 50c separated into adjacent strips are formed at the other edge of the transparent film member 50 at a downstream side in the original feeding direction. The tongue portions 50b separated into the strips extend freely toward an original guiding surface of the discharge guide 16. The tongue portions 50c extend at a backside of the discharge guide 16. The mounting holes 50f formed in the leading edges of the tongue portions 50c engage the protrusions 55a formed on the tension application member 55 as the fasteners.

As described above, the transparent film member 50 is formed in a curved transfer path 35 from the original guiding surface of the transfer guide 15 along the original guiding surface of the discharge guide 16. The transparent film member 50 is elastically pressed against an outer surface of the platen roller 27.

A predetermined space (0.5 mm to 1.0 mm) is formed between the platen 4 and the transparent film member 50, so that the transparent film member 50 can swing downward as shown in FIG. 2. Guide pieces formed on an apparatus frame abut against the upper surface of the platen 4, so that the platen roller 27 mounted on the apparatus frame is positioned to form the space.

The transparent film member 50 is displaced downward in the space by the original when the original enters between the platen roller 27 and the transparent film member 50. As a result, it is possible to smoothly transport the original through the original transport path.

Figure 4:
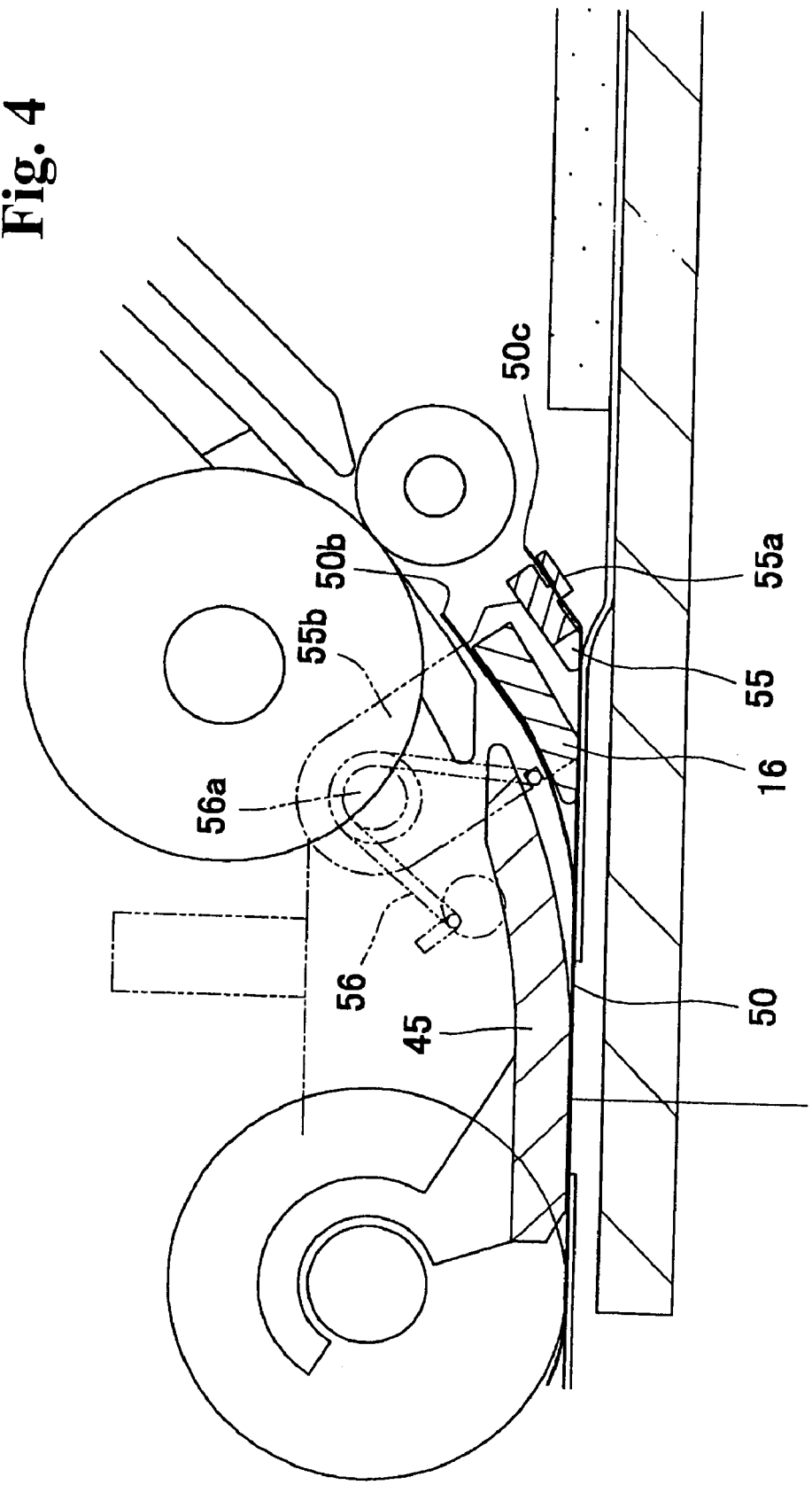
FIG. 4 is a sectional view of an essential portion of tension application means in a reading portion.

FIG. 4 is an enlarged view showing a tension application member 55 in the reading portion 20 of the apparatus. As described above, the tension application member 55 is provided with protrusions 55a for fixing the transparent film member 50 when the protrusions 55a engage the mounting holes 50f on the tongue portion 50c of the transparent film member 50, and arm portions 55b having shaft holes for engaging pins formed on sides of the reading guide unit frame.

A torsion coil spring 56 is disposed between a side of the frame of the reading guide unit 60 and the arm portion 55b for rotatably urging the tension application member 55 in the original feeding direction around pivot shafts (rotating shaft) 56a formed on the side of the reading guide unit 60.

One end of the torsion coil spring 56 is attached to the arm 55b of the tension application member 55, and the other end thereof is attached to the side of the reading guide unit 60 for rotatably urging the tension application member 55 to apply tension to the transparent film member 50.

The tension is applied to the transparent film member 50. As a result, it is possible to eliminate a gap between the platen roller 27 contacting the transparent film member 50 and the upstream side of the discharge guide 16 contacting the tongue portions 50c of the transparent film member 50. Accordingly, the platen roller 27 is aligned substantially parallel to the discharge guide 16.

The transparent film member 50 is formed of an elastic material and the tension application member 55 can adjust the tension applied to the transparent film member 50. Therefore, the transparent film member 50 is displaced toward the platen 4 and pressed against an outer surface of the platen roller 27 even when the originals have various different thicknesses. As a result, when the leading edge and the trailing edge of the original pass through the reading portion, it is possible to transport the original in a stable manner without jamming at the reading position or varying the transport speed.

Figure 9:
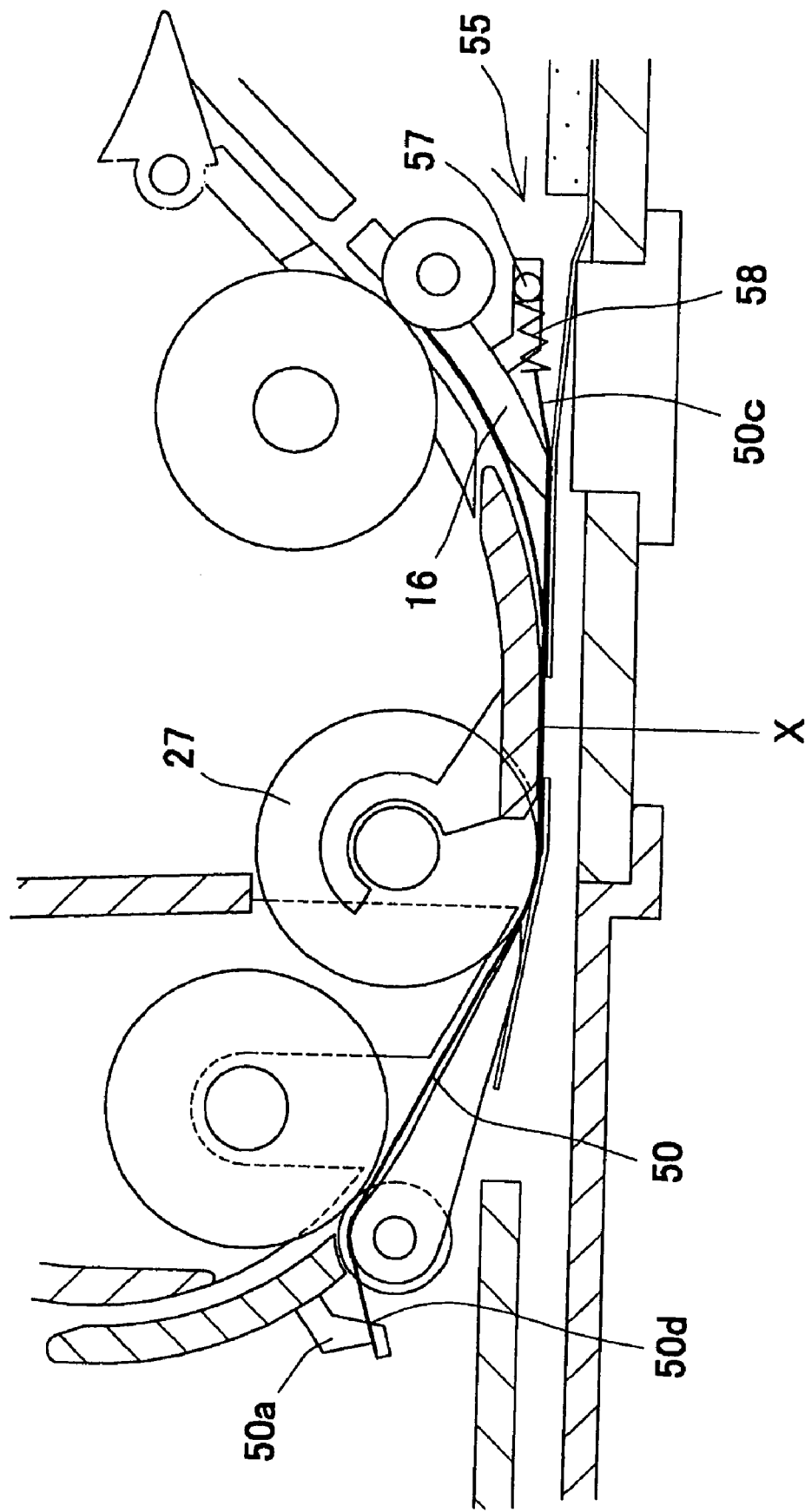
FIG. 9 is a view showing an essential portion of another tension application means.
Figure 11A:
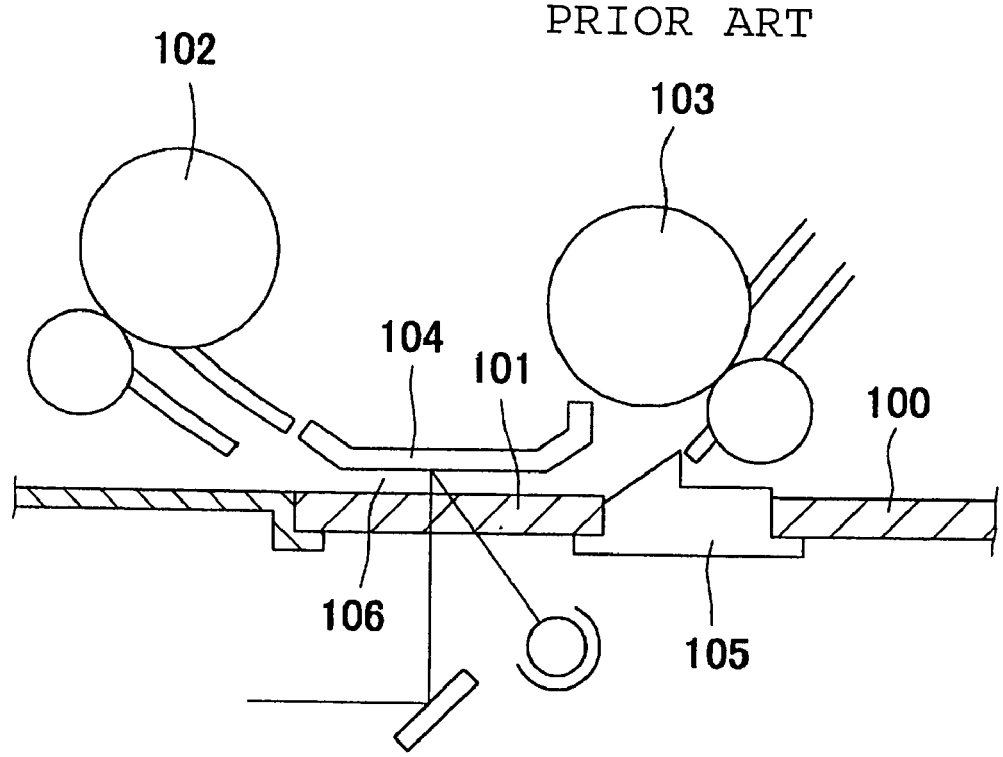
FIGS. 11(a) and 11(b) are views showing an essential portion of a conventional automatic document feeder.
Figure 11B:
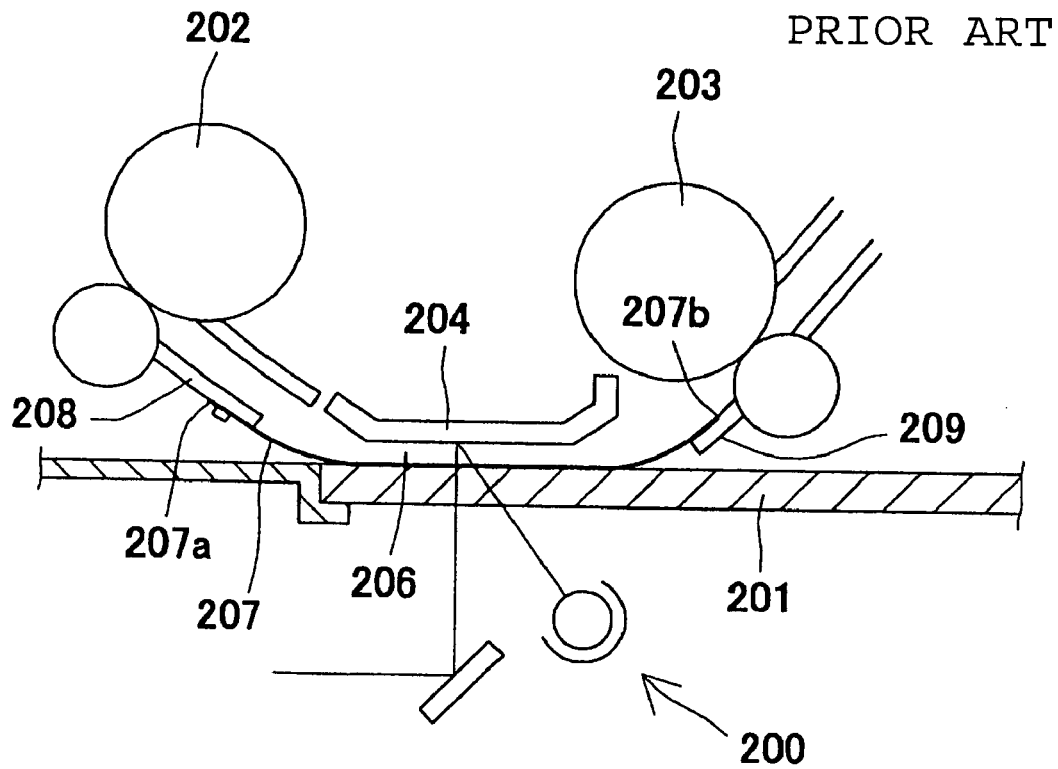

The second embodiment of the tension application means in the apparatus will be explained next. FIG. 9 shows an essential portion of the tension application member 55 in the second embodiment. The tension application member 55 is provided with an urging spring 58 mounted to the tongue portion 50c of the transparent film member 50 for urging the transparent film member 50 in the original feeding direction, and a spring engaging portion 57 formed on the side of the reading guide unit frame for engaging the spring 58.

One end of the spring 58 is mounted to the spring engaging portion 57 on the tension application member 55, and the other end thereof is mounted on the tongue 50c of the transparent film member 50. The spring urges the transparent film member 50 in the original feeding direction to apply tension to the transparent film member 50.

The protrusions 50a on the transfer guide 15 fit in the mounting holes 50d on the transparent film member 50 to fasten the upstream side of the transparent film member 50. The spring 58 applies tension to the transparent film member 50. As a result, it is possible to eliminate a gap between the platen roller 27 contacting the transparent film member 50 and the upstream side of the discharge guide 16 contacting the tongue portions 50c of the transparent film member 50. Accordingly, the platen roller 27 is aligned substantially parallel to the upstream side of the discharge guide 16.

As described above, the transparent film member 50 is formed of an elastic material, and the tension application member 55 can adjust the tension applied to the transparent film member 50. Therefore, the transparent film member 50 is displaced toward the platen 4 and pressed against the outer surface of the platen roller 27 even when the originals have various different thicknesses. As a result, it is possible to transport the original in a stable manner.

The third embodiment of the tension application means in the apparatus will be explained next. FIG. 10 shows an essential portion of the tension application member 55 in the third embodiment of the present invention. A plurality of springs 58b is attached to an edge of the upstream side of the transparent film member 50 in the original feeding direction for urging the transparent film member 50 toward an upstream direction.

The springs 58b are hooked on the spring stopper 57b formed on the transfer guide 15 so that the transparent film member 50 is urged toward the upstream side in the original feeding direction. The tongue portions 50b and 50c separated into a plurality of strips are formed on the downstream edge of the transparent film member 50 in the original feeding direction. The tongue portions 50b separated into the strips extend freely toward an original guiding surface of the discharge guide 16. The tongue portions 50c extend at a backside of the discharge guide 16. The mounting holes 50f formed in the leading edges of the tongue portions 50c engage the protrusions 55a formed on the tension application member 55.

The springs 58b apply tension to the transparent film member 50. As a result, it is possible to eliminate a gap between the platen roller 27 contacting the transparent film member 50 and the upstream side of the discharge guide 16 contacting the tongue portions 50c of the transparent film member 50. Accordingly, the platen roller 27 is aligned substantially parallel to the upstream side of the discharge guide 16.

As described above, the transparent film member 50 is formed of an elastic material and the tension application member 55 can adjust the tension applied to the transparent film member 50. Therefore, the transparent film member 50 is displaced toward the platen 4 and pressed against the outer surface of the platen roller 27 even when the originals have various different thicknesses. As a result, it is possible to transport the original in a stable manner.

In the apparatus of the invention, the tension application means supports and applies tension to the transparent film member. Therefore, the film member is not affected by changes in the environment such as the ambient temperature or humidity, and it is possible to maintain the original transport path for a long period of time.

Further, it is arranged that the space between the film member and the platen is regulated, and the path before and after the reading position is curved to be substantially parallel to the platen surface. Therefore, the guide means securely forms the reading path within a focus depth. Further, it is arranged that the upstream side of the film member in the original feeding direction is fastened and the downstream side thereof is pulled. Therefore, the position of the film member does not move when the original is transported.

Figure 5:
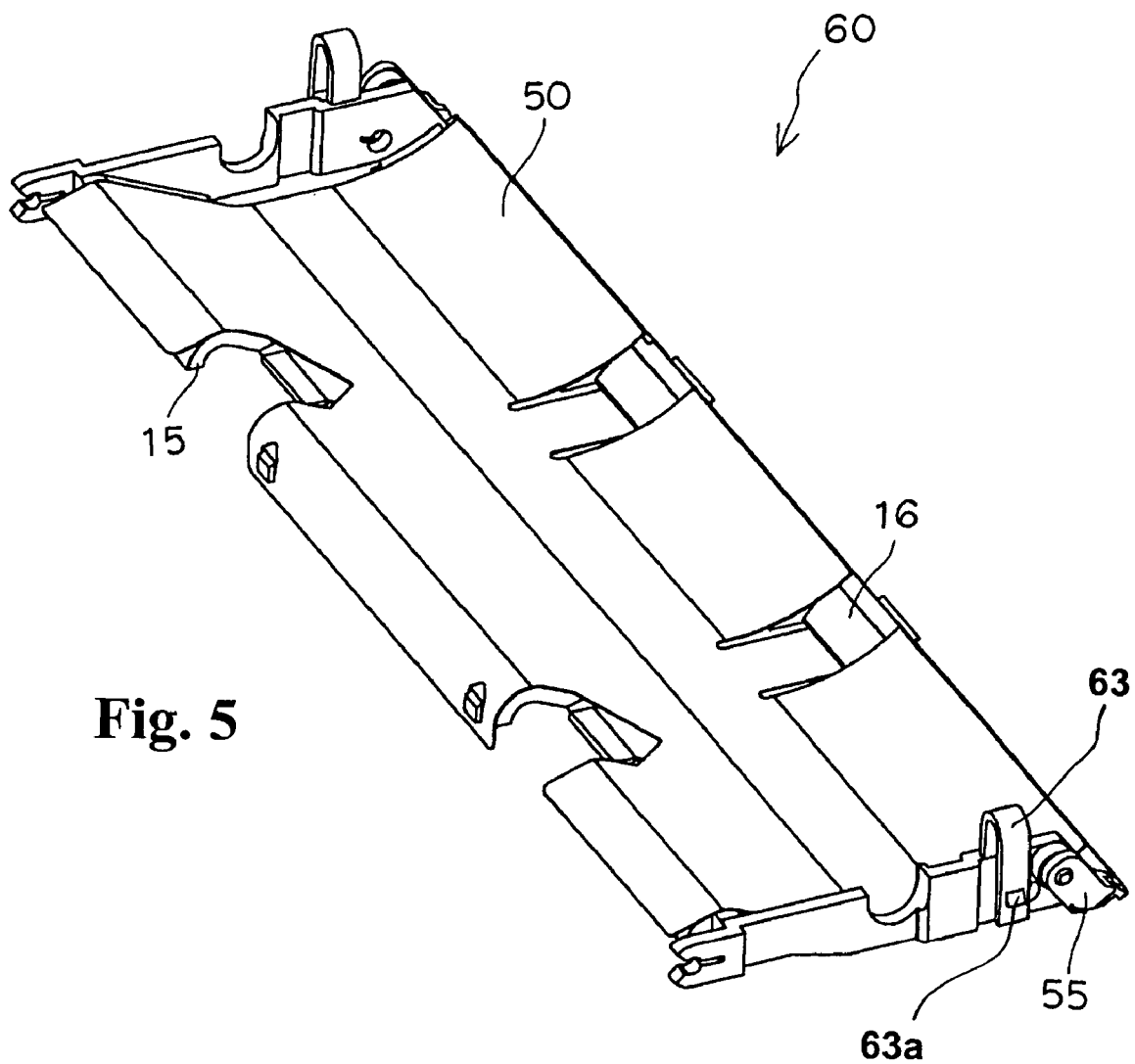
FIG. 5 is a perspective view showing the reading guide unit according to the present invention.

The reading guide unit 60 will be described next. FIG. 5 shows a perspective view of the reading guide unit in which the transfer guide 15, the discharge guide 16 and the transparent film member 50 shown in FIG. 3 are integrated as a unit. The reading guide unit 60 is provided with the transfer guide 15, the discharge guide 16, the transparent film member 50 and the tension application member 55. The reading guide unit 60 is detachably mounted to the apparatus frames 17, i.e. frames of an original transport mechanism in the automatic document feeder. According to the invention, the apparatus frames 17 are disposed at both sides in a direction perpendicular to the original feeding direction.

As shown in FIG. 3, the transfer guide 15 and the discharge guide 16 are integrated as a molded part, and form a frame of the reading guide unit 60. An opening 61 for reading the original is formed at the center of the reading guide unit 60. The transparent film member 50 is mounted at the opening 61. The tension application member 55 is also mounted for supporting the transparent film member 50.

Figure 6:
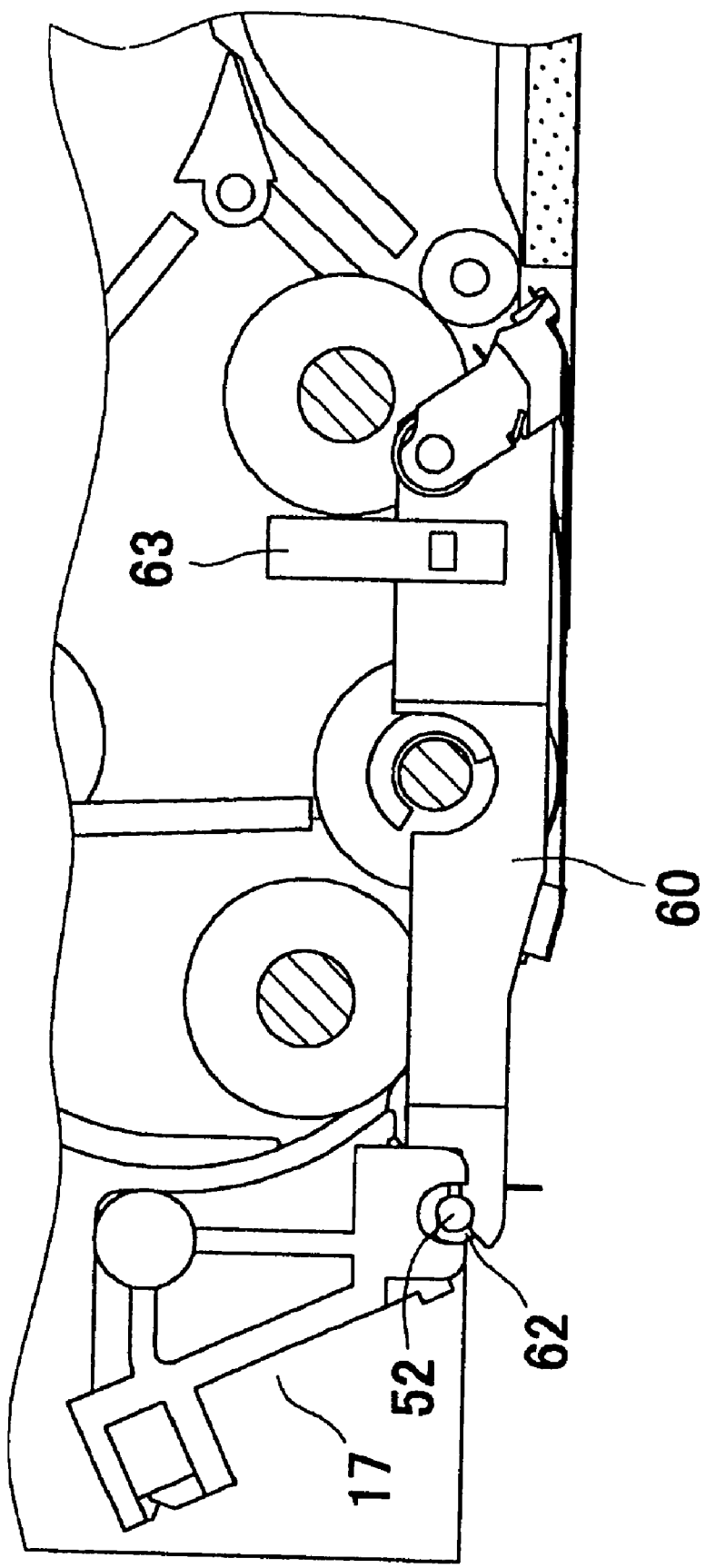
FIG. 6 is a sectional view showing the reading guide unit mounted to the apparatus frame.

FIG. 6 is a sectional view of the reading guide unit 60 mounted to the apparatus frames 17. Notched portions 62 are formed on side portions of the reading guide unit 60 at an upstream side in the original feeding direction for inserting pins 52 formed on the apparatus frame. Also, protruding portions 63 having a key-shape and convex portions 63a are formed on the side portions of the reading guide unit 60 for engaging concave portions 17a formed on the apparatus frames 17 to support the reading guide unit at a predetermined position.

Figure 7:
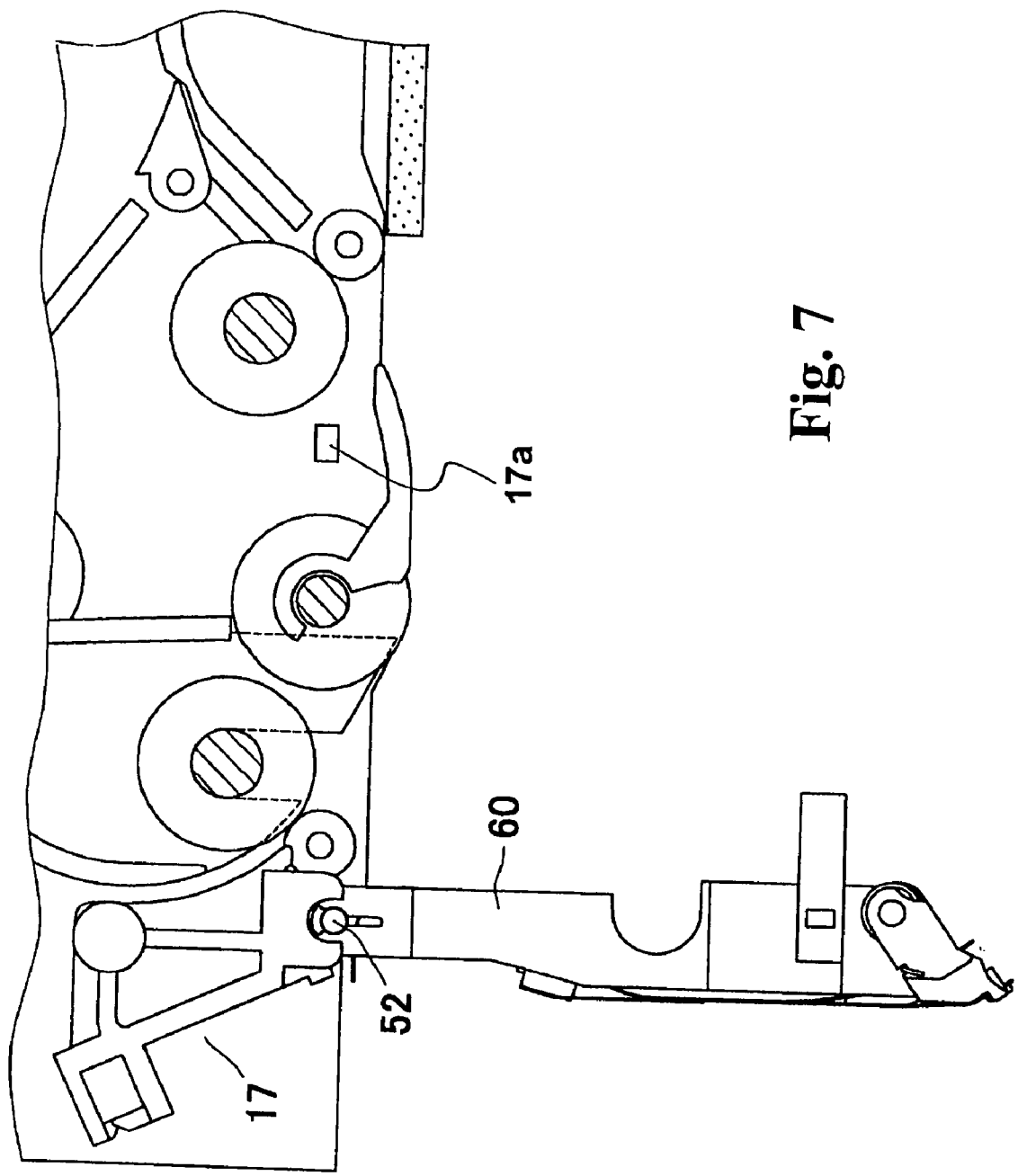
FIG. 7 is a sectional view of the reading guide unit rotated downward relative to the apparatus frame.

FIG. 7 is a sectional view of the reading guide unit 60 rotated downward relative to the apparatus frames 17.

When the reading guide unit 60 is removed from the apparatus frames, first the protruding portions 63 are pressed to bend, so that the convex portions 63a on the protruding portions 63 are released from the concave portions 17a on the apparatus frames 17. Then, the reading guide unit 60 is rotated by a predetermined angle (for example, 90 degrees with regard to the apparatus frames) around the apparatus frame pins 52 on the apparatus frames 17. The protruding portions 63 are made of a plastic and formed in a plate shape, so that the protruding portions 63 can be easily bent. It is easy to disengage the convex portions 63a on the protruding portions 63 from the concave portions 17a on the apparatus frames 17.

Note that when it is necessary to remove just a small amount of dirt or dust on the transparent film member 50, the convex portions 63a on the protruding portion 63 are released from the concave portions 17a on the apparatus frames 17, and the reading guide unit 60 is rotated by a certain angle around the apparatus frame pins 52 to perform such simple maintenance as wiping away the dust.

When the reading guide unit 60 is removed from the apparatus frames 17, the reading guide unit 60 is pulled downward along the notched portions 62 on the reading guide unit 60 to be removed from the apparatus frames 17 as shown in FIG. 8.

When the reading guide unit 60 is attached to the apparatus frames 17, in a reverse order of the process described above, the notched portions 62 on the reading guide unit 60 are pushed in to engage the pins 52 on the apparatus frames 17. Then, the reading guide unit 60 is rotated, so that the concave portions 17a on the apparatus frames 17 engage the convex portions 63a of the protruding portion 63 to mount the reading guide unit 60 onto the apparatus frames 17.

As described above, according to the present invention, the automatic document feeder comprises the guide means for guiding the original from the upstream side of the reading position on the platen to the downstream side. The guide means has the reading guide unit integrally comprising the transfer guide member disposed at the upstream side of the reading position in the original feeding direction for guiding the original to the reading position, the discharge guide member disposed at the downstream side of the reading position in the original feeding direction for guiding the original from the reading position, and the flexible reading guide member arranged between the transfer guide member and the discharge guide member. The reading guide unit is detachably supported on the apparatus frames.

With this configuration, it is possible to smoothly transport the original at the reading portion to attain the quality image data. The transfer guide portion, the guide portion and the discharge guide portion are integrated in the reading guide unit detachably supported on the apparatus frames. Therefore, it is possible to easily perform the maintenance work, such as replacing and cleaning the film member and the white guide, in a shorter period of time.

While the invention has been explained with reference to the specific embodiments of the invention, the explanation is illustrative and the invention is limited only by the appended claims.

What is claimed is:

1. An automatic document feeder for transferring an original through a reading position, comprising:
   an apparatus frame for the automatic document feeder;
   first transport means disposed at an upstream side of the reading position in an original transfer direction for transporting the original to the reading position;
   second transport means disposed at a downstream side of the reading position in the original transfer direction for transporting the original passing through the reading position;
   a curved reading path extending from the first transport means to the second transport means;
   a reading guide unit formed separately from the apparatus frame and including as one unit a first guide member for guiding the original from the first transport means to the reading position; a second guide member for guiding the original passing through the reading position to the second transport means; and a transparent film member formed of a flexible material for forming at least a part of the curved reading path between the first guide member and the second guide member; and
   support means formed on the apparatus frame and the reading guide unit for detachably attaching the reading guide unit as one unit to the apparatus frame, said support means supporting the reading guide unit rotatably to the automatic document feeder.

2. An automatic document feeder according to claim 1, wherein said reading guide unit includes notched portions, and said apparatus frame includes pins for receiving the notched portions to rotationally hold the reading guide unit.

3. An automatic document feeder for transferring an original through a reading position, comprising:
   first transport means disposed at an upstream side of the reading position in an original transfer direction for transporting the original to the reading position;
   second transport means disposed at a downstream side of the reading position in the original transfer direction for transporting the original passing through the reading position;
   a curved reading path extending from the first transport means to the second transport means;
   a reading guide unit including as one unit a first guide member for guiding the original from the first transport means to the reading position; a second guide member for guiding the original passing through the reading position to the second transport means, said first guide member and said second guide member being made of plastic and integrally molded together; and a transparent film member formed of a flexible material for forming at least a part of the curved reading path between the first guide member and the second guide member; and
   support means attached to the reading guide unit for supporting the same.

4. An automatic document feeder according to claim 1, wherein said transparent film member is arranged along a document guiding surface of the first guide member.

5. An automatic document feeder according to claim 1, further comprising tension applying means attached to at least one end of the transparent film member for supporting the at least one end in the original transfer direction and applying tension to the transparent film member.

6. An automatic document feeder according to claim 3, wherein said transparent film member has an edge separated into a plurality of pieces in a width direction at a downstream side in the original transfer direction, a portion of the separated edge extending toward a guiding side of the second guide member, the other portion of the separated edge extending toward a back surface of the second guide member.

7. An automatic document feeder according to claim 1, wherein said support means includes a support shaft attached to the apparatus frame of the automatic document feeder for rotatably supporting the reading guide unit to the apparatus frame.

8. An automatic document feeder according to claim 7, wherein said reading guide unit includes an engagement portion for engaging the support shaft so that the engagement portion is detachable relative to the support shaft.

9. A document reading apparatus for reading an original, comprising,
   a reading unit including a platen for placing the original, and reading means situated under the platen, said reading means being able to move to read the original placed on the platen and being stationary to read the original passing through a reading position on the platen, and the automatic document feeder according to claim 1.

10. A document reading apparatus according to claim 9, wherein said apparatus frame includes a support shaft, and said reading guide unit includes an engagement portion for engaging the support shaft so that the engagement portion is detachably attached to the support shaft.

11. An automatic document feeder according to claim 1, wherein said reading guide unit includes said first guide member, said second guide member, and said transparent film member without including a discharge tray.

* * * * *